(12) United States Patent
Shmotev et al.

(10) Patent No.: US 7,521,389 B2
(45) Date of Patent: Apr. 21, 2009

(54) CERAMIC PROPPANT WITH LOW SPECIFIC WEIGHT

(75) Inventors: Sergey Shmotev, Yekaterinburg (RU); Sergey Pliner, Yekaterinburg (RU)

(73) Assignee: Ilem Research and Development Establishment, Vaduz (LI)

( * ) Notice: Subject to any disclaimer, the term of this patent is extended or adjusted under 35 U.S.C. 154(b) by 0 days.

(21) Appl. No.: 11/824,128

(22) Filed: Jun. 29, 2007

(65) Prior Publication Data

US 2008/0070774 A1  Mar. 20, 2008

Related U.S. Application Data

(63) Continuation of application No. PCT/IB2006/003184, filed on Nov. 3, 2006.

(30) Foreign Application Priority Data

Aug. 4, 2006 (EP) .................. 06405331

(51) Int. Cl.
*C04B 35/04* (2006.01)
(52) U.S. Cl. .................. 501/122; 501/108; 501/110; 501/112; 264/661; 264/681; 166/280.2
(58) Field of Classification Search .................. 501/108, 501/110, 112, 122; 166/280.2; 264/661, 264/681
See application file for complete search history.

(56) References Cited

U.S. PATENT DOCUMENTS

| 2,105,943 | A | 1/1938 | Goldschmidt |
| 3,804,644 | A | 4/1974 | Wilkinson et al. |
| 4,214,910 | A | 7/1980 | Baumgart |
| 4,427,068 | A | 1/1984 | Fitzgibbon |
| 4,713,203 | A | 12/1987 | Andrews |
| 5,030,603 | A | 7/1991 | Rumpf et al. |
| 5,120,455 | A | 6/1992 | Lunghofer |
| 5,188,175 | A | 2/1993 | Sweet |
| 6,753,299 | B2 | 6/2004 | Lunghofer et al. |
| 2004/0069490 | A1 | 4/2004 | Cannan et al. |
| 2005/0096207 | A1 | 5/2005 | Urbaneck |
| 2006/0016598 | A1 | 1/2006 | Urbaneck |
| 2007/0099793 | A1* | 5/2007 | Wilson ........................ 501/118 |
| 2008/0073083 | A1* | 3/2008 | Shmotev et al. .......... 166/280.2 |

FOREIGN PATENT DOCUMENTS

| CA | 1 232 921 | 2/1988 |
| DE | 28 36 050 | 3/1980 |
| EP | 0 207 668 | 1/1987 |
| GB | 441516 | 1/1936 |
| RU | 2235702 | 4/2004 |
| RU | 2235703 | 9/2004 |
| WO | WO 85/03327 | 8/1985 |
| WO | WO 2004/097171 | 11/2004 |
| WO | WO 2007/036579 | 4/2007 |

OTHER PUBLICATIONS

Longwell et al., Physical Geology, Wiley, New York 1969, pp. 620, 621.

* cited by examiner

*Primary Examiner*—Karl E Group
(74) *Attorney, Agent, or Firm*—Weingarten, Schurgin, Gagnebin & Lebovici LLP

(57) ABSTRACT

A precursor composition for the production of granulated ceramic material, particularly for ceramic proppants, comprises 20 to 55% by weight of magnesium orthosilicate, 20 to 35% by weight of MgO, and 2.5 to 11% by weight of $Fe_2O_3$. The resulting lightweight proppant material shows high mechanical strength. To further decrease the specific density of the proppant, the formation of small pores can be increased by adding 0.3 to 2.4% carbon as a gas-forming agent.

27 Claims, No Drawings

CERAMIC PROPPANT WITH LOW SPECIFIC WEIGHT

This application is a continuing application under 35 USC 111(a) of PCT/IB2006/003184 filed Nov. 3, 2006, and claims priority to that International Application (PCT/IB2006/003184 filed Nov. 3, 2006) and to European application No. 06 405 331.7 filed Aug. 4, 2006, which is incorporated herein by reference.

TECHNICAL FIELD

The present invention relates to precursor compositions for the production granulated ceramic material, particularly ceramic proppants, methods for producing such precursor compositions and granulated ceramic material, and ceramic proppants, according to the preamble of the independent claims.

STATE OF THE ART

In order to enhance the yield of oil and gas wells, the permeability of rock can be increased by hydraulic fracturing. By applying hydraulic pressure in the borehole, fractures within the rock are generated, connecting the pores and thus increasing hydrocarbon/gas flow. To hold the fractures constantly open after a hydraulic fracturing treatment, so called proppant is suspended in the fracturing fluid. Proppant material consists of small sized spherical particles, which are deposited in the fractures in order to prop them open after the hydraulic pressure is released.

Various materials have been used as proppants in the past, for example sand, glass beads, walnut shells, aluminum pellets. Such proppants, however, are quickly destroyed under the harsh conditions in the fractures.

To increase the lifetime of proppants in the fractures, under hydrothermal conditions as given in a borehole, the particles thus must show high resistance against mechanical stress and high pressure. Chemical inertness is also necessary.

Ceramic proppants generally show an good compressive strength, but at the same time have a relatively high specific weight.

To allow the suspension and transport of such relatively heavy proppant particles in the hydraulic fluid without fall out of the proppant and accumulation at the bottom of the borehole ("screen-out"), the viscosity of the fluid must be relatively high under low shear conditions. To obtain an adequate flow of the fluid to the fractures, on the other hand, the viscosity of the fluid under high shear conditions must be sufficiently low.

High viscosity fluids, however, are known to have negative effects on the permeability of certain types of geological formations, i.e. coals. Thus proppants with low specific weight and high mechanical strength are advantageous, since they allow the use of fluids with lower viscosity. Highly viscous fluids are based on guar gel, which is rather expensive. In addition, less viscous fluids allow the use of pumps with less performance, which also saves costs.

Sintered bauxite proppants with a high $Al_2O_3$ content are known to show good pressure resistance. U.S. Pat. No. 4,713,203 teaches a fracture proppant with a specific weight of 3.35 $g/cm^3$ (bulk density 1.19 $g/cm^3$), showing pressure resistance up to 138 MPa without reduction of conductivity. U.S. Pat. No. 5,030,603 shows an oil and gas well proppant with a lower $Al_2O_3$ content and with a specific density between 2.65 and 3.0 $g/cm^3$, which may be used up to 55 MPa. Bauxite proppants are based on kaolin clay, a $Al_2O_3$ containing mineral, which is milled, pelletized and subsequently sintered or calcinated.

Other bauxite proppants are shown in U.S. Pat. Nos. 4,427,068, 5,120,455, and U.S. Pat. No. 5,188,175, the latter proposing a proppant with a specific weight of 2.1 $g/cm^3$.

U.S. Pat. 2004/0069490 A1 discloses a kaolin based ceramic proppant with a density between 1.6 and 2.1 $g/cm^3$ (bulk density 0.95-1.3 $g/cm^3$) and a crush resistance of up to 48 MPa. The optimum between low density and high mechanical strength is achieved by firing the proppant at an optimum temperature range between 1200 and 1350° C.

U.S. Pat. 2005/0096207 A1 and US 2006/0016598 A1 disclose proppants with high porosity, manufactured from sol-gel ceramics based on Aluminosilicates or phosphates, with a specific density of 1.7 $g/cm^3$ and a crush resistance of 52 MPa.

U.S. Pat. No. 6,753,299 B2 shows a aluminosilicate based ceramic proppant with an overall alumina content of less than 25% w/w (weight percent) and a silica content of over 45% w/w. The proppant is produced from uncalcined bauxite, shale and quartz, held together by a binder consisting of wollastonite and talcum. The specific weight of the proppant is 2.63 $g/cm^3$ (bulk density 1.51 $g/cm^3$), and the crush resistance goes up to 69 MPa.

EP 0'207'668 A1 discloses a method for producing ceramic proppants with specific densities between 0.84 and 2.25 $g/cm^3$ (bulk densities between 0.35 and 0.79 $g/cm^3$), comprising an outer shell of MgO or $Al_2O_3$ and a microporous core. The proppant was tested only up to 2.7 MPa. The method includes preparation of aluminosilicate raw material, introduction of SiC as a gas forming agent in the amount of 0.1-50% w/w, granulation and firing. It is suggested that the produced spheroids are used as catalyst carriers, construction material fillers, proppants and soundproof filling material. In essence, the disclosed ceramic spheroids are porous glass balls. To prevent the proppant pellets from sticking to each other during the firing process, the pellets are powdered with fire retardant powders ($Al_2O_3$, MgO, $MgCO_3$, etc.). During the firing process a considerable amount of the fire retardant powder is removed with exhaust gases, while the remaining rest covers the spheroid surfaces. This results in porous glass balls with rough surfaces. The authors recommend the use of alkaline aluminosilicate with an iron oxide content below 5% as raw material for the proppant. The disclosed proppants show low strength and considerable dust formation when used, due to the remaining fire retardant powder. This results in very low permeability and insignificant increase of oil recovery after hydraulic fracturing.

RU 2'235'703 C1 discloses a method for producing ceramic proppants based on a magnesium-silicate precursor material with a forsterite content of 55 to 80% w/w. The raw material is ground, pelletized and fired at 1150-1350° C. Since under hydrothermal conditions the forsterite is partially hydrated, the effectively achievable mechanical strength is considerably reduced.

RU 2'235,702 C2 shows a similar method, wherein the magnesium-silicate precursor composition consists of magnesium metasilicate with approx. 40% w/w MgO and approx. 60% w/w $SiO_2$. The resulting proppants show improved strength and acid resistance, and are more stable under hydrothermal conditions as compared to forsterite-based proppants. Due to a very narrow sintering range ($\Delta T$ max. 10-20° C.), the manufacture of such proppants is complicated and expensive. Because of the narrow sintering temperature range, firing in a rotating kiln under standard industrial conditions will produce both under-fired porous proppant particles and over-fired melted proppant particles. The actually achievable strength, resistance to acids, and hydrothermal stability of the resulting proppants under industrial conditions are thus considerably lower than for batches produced under laboratory conditions.

Furthermore a narrow sintering range requires long exposure of the proppant material at sintering temperature to achieve a uniform temperature distribution. This results in magnesium metasilicate crystal growth and phase transformation during the cooling process, which also reduces the quality of the produced proppant.

SUMMARY OF THE INVENTION

An object of the present invention is to provide precursor compositions for the production of granulated ceramic material, particularly ceramic proppants, with low specific density and high pressure stress resistance; a method for the production of such precursor compositions; and a method for the production of granulated ceramic material, particularly ceramic proppants, with low specific density and high pressure stress resistance.

These and other problems are solved by the methods and the composition according to the present invention as defined in the independent claims. Advantageous embodiments and variants are given in the dependent claims.

Ceramic proppants with low specific density and high pressure stress resistance according to the invention are obtained by increasing the amount of pores in the ceramic structure of the proppant particles, by taking advantage of a oxygen producing redox reaction $Fe_2O_3 \rightarrow FeO+O_2$, causing bulging of the particles during sintering. Adding carbon to the precursor composition may further increase the effect. The carbon is oxidized to carbon dioxide that induces the formation of small closed pores in the ceramics.

A precursor composition according to the invention for the production of granulated ceramic materials, particularly for ceramic proppants, comprises 20 to 55% by weight of magnesium orthosilicate, 20 to 35% by weight of MgO, 2.5 to 11% by weight of Fe2O3, and a glass forming component containing SiO2, particularly quartz or feldspar. In an advantageous embodiment a precursor composition according to the invention comprises 3.5 to 10% by weight of Fe2O3.

A method according to the invention for the production of a precursor composition according to the invention comprises the steps of:
preparing a precursor composition comprising 20 to 55% by weight of magnesium orthosilicate, 20 to 35% by weight of MgO, and 2.5 to 11% by weight of Fe2O3, by grinding a corresponding mixture of raw materials;
pelletizing the resulting composition;
sintering the pellets at a temperature between 1150 and 1280° C.; and
grinding the sintered pellets, together with an amount of carbon containing raw material corresponding to 0.3 to 3% by weight of carbon C.

In an advantageous variant of the method, in the second grinding step the sintered material is ground to an average particle size between 2 and 3 µm, and/or the carbon containing material is ground to an average particle size between 0.5 and 3.0 µm.

A method for the production of granulated ceramic material, particularly ceramic proppant, according to the invention comprises the steps:
pelletizing a precursor composition according to the invention; and
sintering the pellets at a temperature between 1160 and 1360° C., and preferably between 1160 and 1260° C.

The proppant material according to the invention may also be used as low weight filler in concrete and plastic, and as heat insulating and soundproof filling material.

Ways to Implement the Invention

It was found that depending on the FeO and $Fe_2O_3$ content and ratio in a ceramic precursor composition the resulting specific density of the fired proppant material varies considerably. It was established that this effect is caused by the following redox reaction during the firing process:

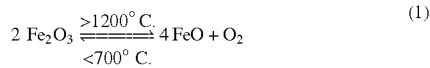

$$2\ Fe_2O_3 \underset{<700°\ C.}{\overset{>1200°\ C.}{\rightleftharpoons}} 4\ FeO + O_2 \qquad (1)$$

$O_2$ produced in the material during firing causes the bulging of the proppant pellets. This bulging effect can be drastically increased when carbonaceous material is introduced into the batch at 0.3-2.4% w/w of carbon. The $Fe_2O_3/FeO$ reduction reaction (1) is shifted to the right, since oxygen is consumed during the oxidation of the carbonaceous material. The generated $CO_2$ facilitates the formation of a large amount of small pores in the ceramic material.

The production of lightweight proppants from aluminosilicate containing precursor material using the redox reaction (1) is difficult, since FeO is an effective fluxing agent for aluminosilicate. This means that a sharp increase of liquid phase and agglomeration of proppant particles takes place during firing, concurrently with gas formation. This problem is circumvented in EP 0'207'668 by limiting the amount of iron oxides to 5% w/w and by powdering the pellets with fire retardant powder to prevent sticking.

Using magnesium orthosilicate in the precursor material the liquid phase content during firing may be reduced by two different mechanisms. Firstly, produced FeO reacts with magnesium orthosilicate to olivine, $2(Mg,Fe)SiO_4$. Secondly, the resulting olivine reacts with the silicate melt, producing pyroxene crystals. If the chosen component ratio is optimal, the maximum amount of liquid phase does not exceed 30% during the firing procedure, and the proppant pellets do not stick together. The use of a fire retardant as in the prior art is thus not necessary, which avoids powder residues.

An advantageous embodiment of a ceramic proppant according to the invention is based on a precursor composition containing 20-60% w/w of magnesium orthosilicate, 3.5-11% w/w of iron oxide ($Fe_2O_3$), and carbon as a gas forming agent, with a total carbon content of 0.3-2.4%. Silicon carbide, iron carbide, boron carbide, carbon in the form of coke, soot, etc. may be used as gas forming agents.

The precursor material according to invention is ground up, pelletized, and sintered in a revolving kiln at 1160-1260° C. The resulting lightweight ceramic proppant has a bulk density of 0.8-1.4 g/cm³.

Less than 25% of the proppant particles are destroyed when being subject to pressures up to 35 MPa. A bulk density of 0.8-1.4 g/cm³ (specific density 2.0 to 2.6 g/cm³) allows the use of low viscosity gels and even water during hydraulic fracturing.

The grain size of magnesium orthosilicate and carbonaceous material in the precursor composition is also very important. If the magnesium orthosilicate grains of the precursor composition are too small and the carbonaceous material grains too large, the pyroxene producing reaction occurs before gas formation is initiated. The resulting proppant particles will have large open pores, poor strength and high water absorption characteristics, instead of light weight proppants with a large number of small and closed pores Tests established that the average grain size of magnesium orthosilicate have to be within 5 to 20 μm, while the size of carbonaceous material grains have to be within 0.5 to 3 μm. Carbonaceous material with a grain size below 0.5 μm is burned before a liquid phase sufficient for the bulging effect is produced. Grains larger than 3 μm will not be burned completely during the firing process, and end up as an inert filler, increasing the proppant's density.

The necessary amount of carbonaceous material depends on the $Fe_2O_3$ content in the precursor batch. The higher the amount of $Fe_2O_3$, the higher may be the amount of carbonaceous material. However, if the $Fe_2O_3$ content is above 11% by weight, a considerable amount of magnesiomagnetite $(Mg,Fe)Fe_2O_4$ is found in the ceramic structure of the particles, which increases the specific density and decreases the strength of proppants. If the $Fe_2O_3$ content is below 3.5% w/w, the pore formation process is slow and the proppant density does not decrease significantly.

Forsterite produced by oxidized firing of serpentinite, dunite, natural olivine, or talc-magnesite, or forsterite synthesized from pure MgO and $SiO_2$ (to transform FeO into $Fe_2O_3$) may be used as the magnesium orthosilicate material. Quartz/feldspar raw materials, granite, felsite, opal-cristobalite rocks, shale and other materials containing 65-80% w/w of $SiO_2$ may be used as the glass phase forming components.

Graphite, coke, soot, carbides of boron, iron, silicium, titan, zirconium, etc can be used as gas producing agents. From the point of view of cost-efficiency graphite and coke are the preferred choice as the carbonaceous material.

EXAMPLES

Raw serpentinite and quartz/feldspar sand are ground, granulated and fired at 1150° C. in a revolving kiln. The resulting material is re-ground together with the carbonaceous material, iron oxide in the form of red mud (bauxite residue, a by-product of the Bayer Process alumina production, with 1.9% w/w MgO, 10.4% $SiO_2$, 52% $FeO+Fe_2O_3$, 13.8% CaO, 14.1% $Al_2O_3$, 0.1% $K_2O$, 3.4% $Na_2O$, 3.7% $TiO_2$, 0.6% $P_2O_5$), and an adhesive additive (preferably water glass). The resulting precursor composition was granulated and fired in the revolving kiln at a temperature between 1160 and 1260° C.

The specific properties of the produced lightweight proppants in comparison to the state of the art are shown in the following Table 1.

TABLE 1

| Example No. | Precursor composition*, in % w/w | Firing temperature, in ° C. | Bulk density/specific density of US mesh 12/18 fraction (= particle size between 1.00 and 1.68 mm), in g/cm³ | crush strength of US mesh 12/18 fraction, in %, at 36 MPa, |
|---|---|---|---|---|
| 1 | MgO 38%, $Fe_2O_3$ 8.9% RU 2235703 C1 | 1280 | 1.68/2.56 | 3.2% |
| 2 | MgO 3.7%, $Fe_2O_3$ 2.8%, SiC 5% EP 0207668 A1 | 1180 | 0.92/2.33 | 58.9% |
| 3 | MgO 22%, $Fe_2O_3$ 2.8%, magnesium orthosilicate 30%, coke 2.4% | 1240 | 1.24/2.43 | 12.3% |
| 4 | MgO 15%, $Fe_2O_3$ 3.5%, magnesium orthosilicate 20%, graphite 0.3% | 1160 | 1.34/2.41 | 21.8% |
| 5 | MgO 15%, $Fe_2O_3$ 9.7%, magnesium orthosilicate 20%, boron carbide (converted to carbon) 2.0% | 1180 | 1.12/2.47 | 17.6% |
| 6 | MgO 32.1%, $Fe_2O_3$ 7.4%, magnesium orthosilicate 55%, SiC (converted to carbon) 1.9% | 1320 | 1.36/2.63 | 8.3% |
| 7 | MgO 24%, $Fe_2O_3$ 6.8%, magnesium orthosilicate 32%, coke 2% | 1240 | 0.79/2.54 | 24.3% |
| 8 | MgO 26.8%, $Fe_2O_3$ 5.4%, magnesium orthosilicate 28%, titan carbide (converted to carbon) 1.2% | 1260 | 1.1/2.56 | 14.9% |

*Remaining component up to 100% is quartz/feldspar raw material

The data in Table 1 show that the precursor compositions according to the invention (example No. 3 to 8) allow to produce proppants with a bulk density of 0.8-1.4 g/cm³. Less than 25% of the proppants are destroyed at 36 MPa. The above data have been confirmed by independent tests carried out by Stimlab Laboratory (USA).

The invention claimed is:

1. A precursor composition for the production of granulated ceramic material, comprising 20 to 55% by weight of magnesium orthosilicate, 20 to 35% by weight of MgO, 2.5 to 11% by weight of $Fe_2O_3$, and a glass forming component containing $SiO_2$.

2. The precursor composition according to claim 1, wherein the composition comprises 3.5 to 10% by weight of $Fe_2O_3$.

3. The precursor composition according to claim 1, wherein the composition comprises up to 3% by weight of carbon.

4. The precursor composition according to claim 3, wherein the composition comprises 0.3 to 2.4% by weight of carbon.

5. The precursor composition according to claim 3, wherein carbon is present as graphite, coke, soot, boron carbide, iron carbide, silicium carbide, titanium carbide, zirconium carbide, or a mixture thereof.

6. The precursor composition according to claim 3, wherein the carbon is present in the form of carbon containing particles with a size between 0.5 and 3 μm.

7. The precursor composition according to claim 1, wherein the magnesium orthosilicate is present in the form of magnesium orthosilicate containing particles with a size between 5 and 20 μm.

8. A method for the production of a precursor composition, comprising the steps of:
  (a) preparing a precursor composition comprising 20 to 55% by weight of magnesium orthosilicate, 15 to 35% by weight of MgO, and 2.5 to 11% by weight of $Fe_2O_3$, by grinding a corresponding mixture of raw materials;
  (b) pelletizing the resulting composition;
  (c) sintering the pellets at a temperature between 1150 and 1280° C,; and
  (d) grinding the sintered pellets, together with an amount of carbon containing raw material corresponding to 0.3 to 3% by weight of carbon.

9. The method according to claim 8, wherein in step (d) the sintered material is ground to an average particle size between 2 and 3 μm.

10. The method according to claim 8, wherein in step (d) the carbon containing material is ground to an average particle size between 0.5 and 3.0 μm.

11. The method according to claim 8, wherein the sintering step is carried out in a revolving kiln.

12. A precursor composition produced with a method comprising the steps of:
  (a) preparing a composition comprising 20 to 55% by weight of magnesium orthosilicate, 15 to 35% by weight of MgO, and 2.5 to 11% by weight of $Fe_2O_3$, by grinding a corresponding mixture of raw materials;
  (b) pelletizing the composition produced in step (a);
  (c) sintering the pellets at a temperature between 1150 and 1280° C.; and
  (d) grinding the sintered pellets together with an amount of carbon containing raw material corresponding to 0.3 to 3% by weight of carbon to produce a precursor composition.

13. A method for the production of a granulated ceramic material, comprising the steps of:
  (a) pelletizing a precursor composition comprising 20 to 55% by weight of magnesium orthosilicate, 15 to 35% by weight of MgO, 2.5 to 11% by weight of $Fe_2O_3$, and a glass forming component containing $SiO_2$; and
  (b) sintering the pellets at a temperature between 1160 and 1360° C.

14. A granulated ceramic material produced with a method comprising the steps of:
  (a) pelletizing a precursor composition comprising 20 to 55% by weight of magnesium orthosilicate, thereof 15 to 35% by weight of MgO, 2.5 to 11% by weight of $Fe_2O_3$, and a glass forming component containing $SiO_2$; and
  (b) sintering the pellets at a temperature between 1160 and 1360° C.

15. A method of hydraulically fracturing a subterranean bore, the method comprising the steps of:
  (a) applying hydraulic pressure to the bore so as to fracture rock adjacent to the bore; and
  (b) adding a fluid suspension comprising a granulated ceramic material according to claim 14 to the fractured bore.

16. The precursor composition according to claim 2, wherein:
  the composition comprises up to 3% by weight of carbon;
  carbon is present as graphite, coke, soot, boron carbide, iron carbide, silicium carbide, titanium carbide, zirconium carbide, or a mixture thereof;
  the carbon C is present in the form of carbon containing particles with a size between 0.5 and 3 μm;
  the magnesium orthosilicate is present in the form of magnesium orthosilicate containing particles with a size between 5 and 20 μm.

17. The method according to claim 9, wherein:
  in step (d) the carbon containing material is ground to an average particle size between 0.5 and 3.0 the sintering step is carried out in a revolving kiln.

18. A precursor composition produced with a method comprising the steps of:
  (a) preparing a composition comprising 20 to 55% by weight of magnesium orthosilicate, 15 to 35% by weight of MgO, and 2.5 to 11% by weight of $Fe_2O_3$, by grinding a corresponding mixture of raw materials;
  (b) pelletizing the composition produced in step (a);
  (c) sintering the pellets at a temperature between 1150 and 1280° C. in a rotating kiln; and
  (d) grinding the sintered pellets together with an amount of carbon containing raw material corresponding to 0.3 to 3% by weight of carbon to produce a precursor composition, whereby the sintered material is ground to an average particle size between 2 and 3 μm, and the carbon containing material is ground to an average particle size between 0.5 and 3.0 μm.

19. A method for the production of granulated ceramic material, comprising the steps:
  pelletizing a precursor composition according to claim 17; and
  sintering the pellets at a temperature between 1160 and 1360°C.

20. A method for the production of a granulated ceramic material, comprising the steps of:
  (a) pelletizing the precursor composition of claim 12; and
  (b) sintering the pellets at a temperature between 1160 and 1360° C.

21. A method for the production of a granulated ceramic material, comprising the steps of:
  (a) pelletizing the precursor composition of claim 18; and
  (b) sintering the pellets at a temperature between 1160 and 1360° C.

22. A granulated ceramic material produced with a method comprising the steps of:
  (a) pelletizing the precursor composition of claim 12; and
  (b) sintering the pellets at a temperature between 1160 and 1360° C.

23. A method of hydraulically fracturing a subterranean bore, the method comprising the steps of:
  (a) applying hydraulic pressure to the bore so as to fracture rock adjacent to the bore; and
  (b) adding a fluid suspension comprising the granulated ceramic material of claim 22 to the fractured bore.

24. The precursor composition according to claim 1, wherein the glass forming component is quartz or feldspar.

25. The method of claim 19, wherein the step of sintering is carried out at a temperature of between 1160 and 1260° C.

26. The precursor material of claim 1 that is for the production of a ceramic proppant.

27. The method of claim 19 that is for the production of a ceramic proppant.

* * * * *

UNITED STATES PATENT AND TRADEMARK OFFICE
CERTIFICATE OF CORRECTION

PATENT NO. : 7,521,389 B2
APPLICATION NO. : 11/824128
DATED : April 21, 2009
INVENTOR(S) : Shmotev et al.

It is certified that error appears in the above-identified patent and that said Letters Patent is hereby corrected as shown below:

Column 8, line 37, claim 19, "17" should read --16--.

Signed and Sealed this

Twenty-second Day of December, 2009

David J. Kappos
*Director of the United States Patent and Trademark Office*